(12) United States Patent
Yamagata

(10) Patent No.: US 11,703,748 B2
(45) Date of Patent: Jul. 18, 2023

(54) LIGHT SOURCE LIGHTING DEVICE AND PROJECTION DISPLAY APPARATUS

(71) Applicant: Panasonic Intellectual Property Management Co., Ltd., Osaka (JP)

(72) Inventor: Yuki Yamagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/670,813

(22) Filed: Feb. 14, 2022

(65) Prior Publication Data
US 2022/0163878 A1 May 26, 2022

Related U.S. Application Data

(63) Continuation of application No. PCT/JP2020/031929, filed on Aug. 25, 2020.

(30) Foreign Application Priority Data

Aug. 28, 2019 (JP) ................. 2019-155957

(51) Int. Cl.
*G03B 21/20* (2006.01)
*H04N 9/31* (2006.01)
*G02B 19/00* (2006.01)

(52) U.S. Cl.
CPC ....... *G03B 21/204* (2013.01); *G02B 19/0047* (2013.01); *G03B 21/2013* (2013.01); *H04N 9/3161* (2013.01); *H04N 9/3164* (2013.01)

(58) Field of Classification Search
CPC .............. G03B 21/208; G03B 21/2013; G03B 21/2033; H04N 9/3161; H04N 9/3164;
(Continued)

(56) References Cited

U.S. PATENT DOCUMENTS

| 2011/0157566 A1 | 6/2011 | Akiyama |
| 2012/0002173 A1 | 1/2012 | Akiyama |
| (Continued) | | |

FOREIGN PATENT DOCUMENTS

| JP | 2006-285043 | 10/2006 |
| JP | 2007-47707 | 2/2007 |
| (Continued) | | |

OTHER PUBLICATIONS

International Search Report issued Oct. 27, 2020 in corresponding International Application No. PCT/JP2020/031929.

*Primary Examiner* — Ryan D Howard
(74) *Attorney, Agent, or Firm* — Wenderoth, Lind & Ponack, L.L.P.

(57) ABSTRACT

A light source lighting device includes: a laser light source unit; a converging lens that converges a plurality of light beams emitted from the laser light source unit; a diffuser plate that diffuses a plurality of light beams converged by the converging lens; and a second collimating lens that collimates a light beam diffused by the diffuser plate. The converging lens has an aspherical surface, the second collimating lens has a spherical surface, the aspherical surface of the converging lens has an aspherical surface coefficient that is set to cancel a positive spherical aberration of the second collimating lens. A luminous flux density in a proximity of an optical axis is lower than a luminous flux density in a peripheral part away from the optical axis, the optical axis being an axis of a light beam emitted from the second collimating lens.

4 Claims, 3 Drawing Sheets

(58) Field of Classification Search
CPC ... H04N 9/3152; G02B 19/0047; G02B 27/30
See application file for complete search history.

(56) References Cited

U.S. PATENT DOCUMENTS

2012/0051044 A1* 3/2012 Akiyama ........... G03B 21/2033
362/233
2014/0375958 A1 12/2014 Kuwata et al.

FOREIGN PATENT DOCUMENTS

| | | |
|---|---|---|
| JP | 2012-14045 | 1/2012 |
| JP | 2012-123948 | 6/2012 |
| JP | 5651949 | 1/2015 |
| JP | 2015-40892 | 3/2015 |
| JP | 5691411 | 4/2015 |
| JP | 2017-102391 | 6/2017 |
| WO | 2013/114665 | 8/2013 |

* cited by examiner

LIGHT SOURCE LIGHTING DEVICE AND PROJECTION DISPLAY APPARATUS

BACKGROUND

1. Technical Field

The present disclosure relates to a light source lighting device that converges light beams from a plurality of laser light sources, and a projection display apparatus using the light source lighting device.

2. Description of the Related Art

With regard to light sources used in projection display apparatuses, due to the progress of solid-state light source technologies, conventional discharge tube lamps are being replaced by light emitting diodes (LEDs) and semiconductor lasers, which have advantages such as long life time, mercury free, and nonexplosive. In particular, a single piece of a semiconductor laser has a small light output but has a relatively small etendue of the light output; therefore, a plurality of semiconductor lasers unitized in an array shape is used as a light source, and a projector having a high output exceeding 5,000 lumens is also commercialized.

Patent Literature 1 is Unexamined Japanese Patent Publication No. 2012-014045.

SUMMARY

However, in a projector using laser, in order to suppress color unevenness, it is necessary to equalize, between light of each color light source, a light intensity distribution of light emitted from a rod integrator for generating uniform light. When an incident angle of light entering the rod integrator is large, the uniformization can be performed with a short rod length (hereinafter, the length of a rod integrator is referred to as a "rod length"); however, there is a limitation in a maximum value of the incident angle to efficiently use the light. To equalize the light intensity distribution within a limited incident angle, it can be necessary to extend the rod length. This leads to an increase in projector set size.

The present disclosure provides a light source lighting device capable of generating uniform light without extending a rod length, thereby contributing to downsizing of a light source unit, and provide a projection display apparatus using the light source lighting device.

A light source lighting device according to the present disclosure includes: a laser light source unit including a plurality of semiconductor lasers, and a first collimating lens that collimates a plurality of light beams emitted from the plurality of semiconductor lasers; a converging lens that converges a plurality of light beams emitted from the laser light source unit; at least one diffuser plate that diffuses a plurality of light beams converged by the converging lens; and a second collimating lens that collimates a light beam diffused by the at least one diffuser plate. The converging lens has an aspherical surface, the second collimating lens has a spherical surface, the aspherical surface of the converging lens has an aspherical surface coefficient that is set to cancel a positive spherical aberration of the second collimating lens. A luminous flux density, in a proximity of an optical axis is set to be lower than a luminous flux density in a peripheral part away from the optical axis, the optical axis being an axis of a light beam emitted from the second collimating lens.

Therefore, with the light source lighting device and the like according to the present disclosure, it is possible to generate uniform light without extending the rod length and to contribute to miniaturization of the light source unit.

DETAILED DESCRIPTION

Hereinafter, exemplary embodiments will be described in detail appropriately with reference to the drawings. However, unnecessarily detailed description will be omitted in some cases. For example, the detailed description of already well-known matters and the redundant description of a configuration substantially identical to the already-described configuration will be omitted in some cases. This is to prevent the following description from being unnecessarily redundant and to enable those skilled in the art to easily understand the present disclosure.

Note that the attached drawings and the following description are provided for those skilled in the art to fully understand the present disclosure, and are not intended to limit the subject matter described in the appended claims.

First Exemplary Embodiment

Figure 1:
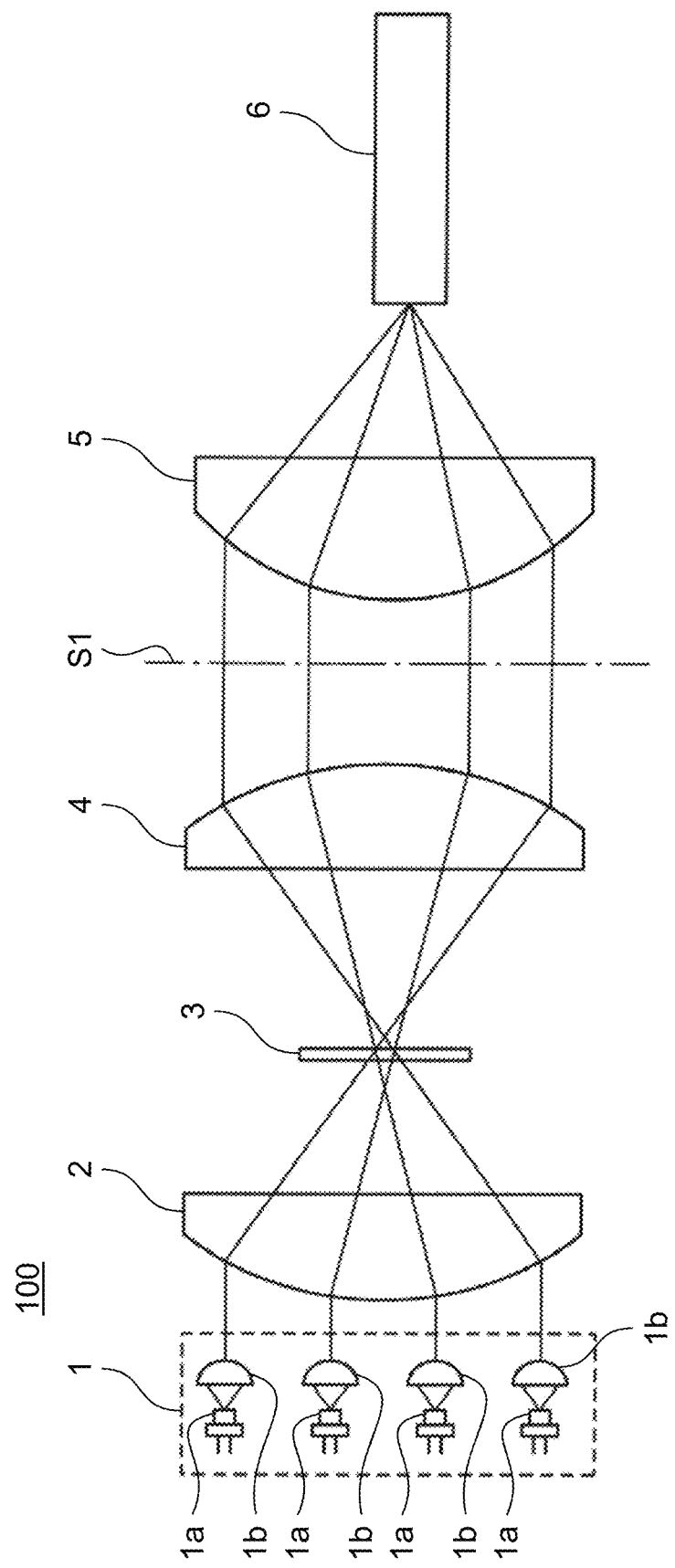
FIG. 1 is a block diagram illustrating a configuration example of light source lighting device 100 according to a first exemplary embodiment.
Figure 2:
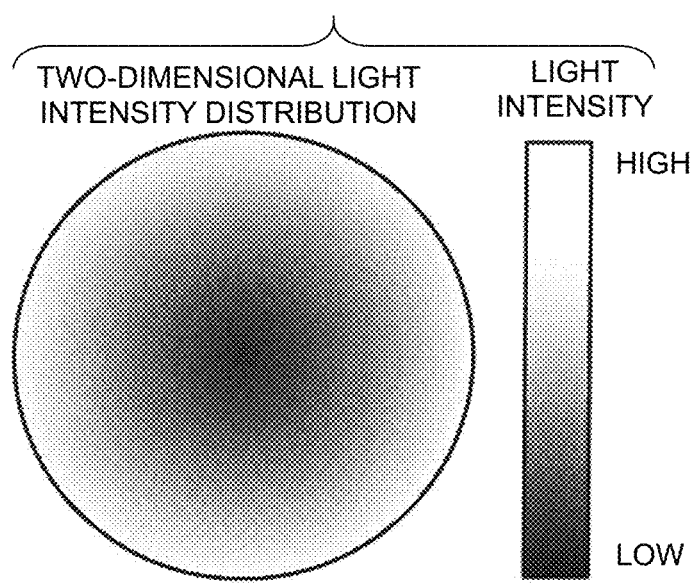
FIG. 2 is a diagram illustrating a two-dimensional light intensity distribution on plane S1 of FIG. 1.

FIG. 1 is a block diagram illustrating a configuration example of light source lighting device 100 according to a first exemplary embodiment. FIG. 2 is a diagram illustrating a two-dimensional light intensity distribution on plane S1 of FIG. 1.

With reference to FIG. 1, light source lighting device 100 includes light source device 1, aspherical lens 2, diffuser plate 3, spherical lens 4, rod converging lens 5, and rod integrator 6, and these components are disposed side by side along a predetermined optical axis. Note that, in addition to these components illustrated in FIG. 1, light source lighting device 100 may appropriately include an optical element for changing an optical path such as a reflection mirror.

In light source device 1 that is a laser light source unit, a plurality of laser diode (LD) arrays are configured with a plurality of semiconductor lasers 1a arranged in an array and collimating lenses 1b that collimate light beams from respective ones of semiconductor lasers 1a, and the plurality of light beams emitted from the plurality of LD arrays are converged by aspherical lens 2. Aspherical lens 2 has an incident surface that is an elliptical surface and an emission surface that is a planar surface, and constitutes a converging lens. Here, to converge light as described above, a conical coefficient K of the incident surface of aspherical lens 2 preferably satisfies the relationship $-1.3 \le K \le -0.5$. The light beams converged by aspherical lens 2 enter spherical lens 4 through at least one diffuser plate 3, for example. Thus, the light beams emitted from the plurality of LD arrays are converged, and a light intensity distribution on a screen is favorably uniformized through at least one diffuser plate 3, and speckle noise of laser light is eliminated.

Subsequently, the light beams diffused by diffuser plate 3 are collimated by spherical lens 4 serving as a collimating lens. Spherical lens 4 includes an incident surface that is a planar surface and an emission surface that is a spherical surface. Here, since aspherical lens 2 has an elliptical surface, a distribution of light emitted from spherical lens 4 is a light beam distribution characterized in that a luminous flux density in the vicinity of an optical axis center is lower than a luminous flux density in a peripheral part of the lens as illustrated in FIG. 2. Further, the collimated light beam emitted from spherical lens 4 is converged and guided to an incident surface of rod integrator 6 by rod converging lens 5.

With regard to an incident angle of the light beam converged on rod integrator 6, the light beam passing through the vicinity of a center of rod converging lens 5 has a small incident angle, and the light beam passing through a peripheral part of rod converging lens 5 has a large incident angle. The light beam converged on rod integrator 6 is reflected inside the rod of rod integrator 6 a plurality of times, so that the light intensity distribution is uniformed. As the incident angle on rod integrator 6 increases, a number of reflections increases; therefore, the required rod length can be shortened, thereby contributing to downsizing of the projector set size.

As described above, with the present exemplary embodiment, by using the two convex lenses of aspherical lens 2 including an aspherical surface and spherical lens 4, the luminous flux density in the vicinity of the optical axis center is lower than the luminous flux density in the peripheral part of the lens; therefore, it is possible to provide an illumination optical system that prevents occurrence of color unevenness without extending the rod length.

In addition, since the light beams from the plurality of LD arrays are converged by aspherical lens 2 having the incident surface that is an elliptical surface, it is possible to form, in the light intensity distribution (at the position of plane S1 in FIG. 1) after collimation by spherical lens 4, a distribution in which the light intensity in the peripheral part of the lens is larger than the light intensity in the vicinity of the optical axis. Here, the light intensity distribution on plane S1 in FIG. 1 affects an incident angle (converging angle) of the light beam entering the rod integrator; and on plane S1, the light beam in the vicinity of the optical axis has a small converging angle at the time of entering the rod, and the light beam on the peripheral part of the lens has a large converging angle at the time of entering the rod. As a result, the larger the converging angle is, the larger number of times the reflection occurs inside the rod, and the length of the rod integrator can be shortened.

Further, since an aspherical lens having an elliptical surface is used to converge the light, the light intensity at the peripheral part of the lens on plane S1 in FIG. 1 is larger; therefore, a component having a large converging angle can be increased, so that the length of the rod integrator can be shortened.

In other words, since the aspherical surface of first aspherical lens 2 has such a negative spherical aberration that cancels a positive spherical aberration of spherical lens 4, the light intensity distribution of the light beam having passed through spherical lens 4, which is the second convex lens, becomes denser as the image height becomes higher as illustrated in FIG. 2. That is, since the light beam has the light intensity distribution that becomes denser as the image height becomes higher, a component having a large converging angle at the time of entering rod integrator 6 increases; therefore, uniform light can be generated without extending the length of rod integrator 6. This produces a unique effect of contributing to downsizing of the light source unit including the light source lighting device.

As described above, with the present exemplary embodiment, it is possible to provide the light source lighting device capable of generating uniform light without extending the length of the rod integrator, thereby contributing to miniaturization of the light source unit.

Second Exemplary Embodiment

Figure 3:
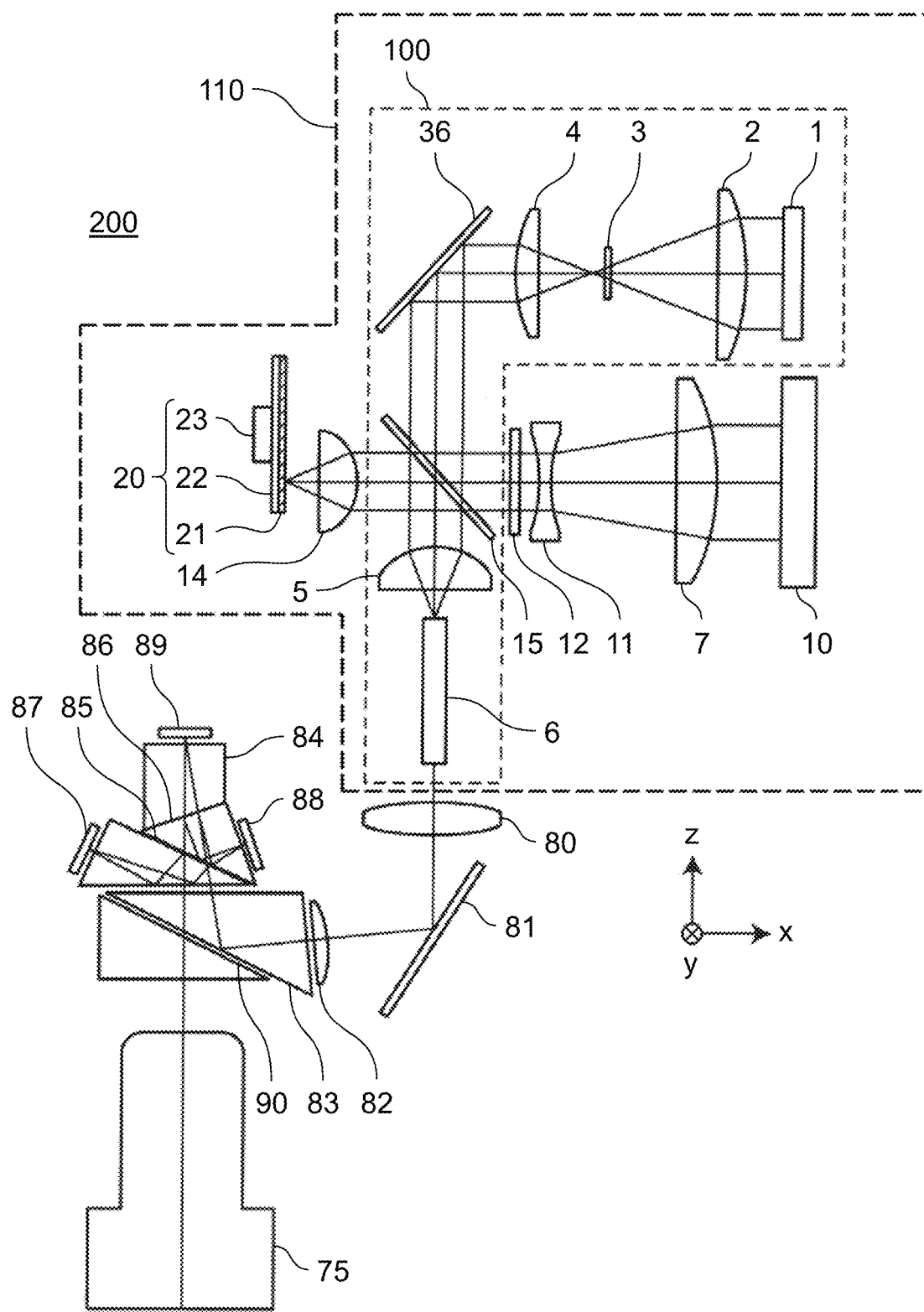
FIG. 3 is a block diagram illustrating a configuration example of projection display apparatus 200 according to a second exemplary embodiment.

FIG. 3 is a block diagram illustrating a configuration example of projection display apparatus 200 according to a second exemplary embodiment. Here, projection display apparatus 200 is configured by using light source lighting device 100 according to the first exemplary embodiment, and three digital micro-mirror devices (DMDs) 87, 88, 89 are used as image forming elements. With reference to FIG. 3, blue semiconductor lasers are used as semiconductor laser elements of light source device 1 and light source device 10, and light source device 1 and light source device 10 emit blue light. Note that light source lighting device 100 includes reflection mirror 36 for bending an angle of the light beam in addition to the components of FIG. 1.

Projection display apparatus 200 according to the second exemplary embodiment includes, in addition to light source lighting device 100, white light lighting device 110 including light source device 10, lens 7, lens 11, diffuser plate 12, dichroic mirror 15, condenser lens 14, and phosphor substrate 20. Here, dichroic mirror 15 transmits blue light from light source device 1 and light source device 10, reflects yellow light (fluorescent light) that is generated from blue light by color-conversion by phosphor substrate 20, thereby combining the blue light and the yellow light. Phosphor substrate 20 includes: aluminum substrate 22 on which a reflection film and phosphor layer 21 are formed; and motor 23. Projection display apparatus 200 further includes relay lens 80, reflection mirror 81, field lens 82, total internal reflection prism 83, color prism 84, DMDs 87, 88, 89, and projection lens 75. An optical path from relay lens 80 to color prism 84 is a light guide that guides the light from light source device 1 or light source device 10 to areas to be illuminated (light incident surfaces of DMDs 87, 88, 89). DMDs 87, 88, 89 are examples of light modulation elements that modulate and emit incident light, and are arranged in the areas to be illuminated.

The light flux emitted from light source device 10 is converged by lens 7, is converted back to a substantially parallel light beam by lens 11, and then passes through diffuser plate 12. Diffuser plate 12 is made of glass, and fine irregularities on the surface diffuse the light. Dichroic mirror 15 has characteristics that dichroic mirror 15 transmits the blue light from light source device 10 and reflects red light and green light.

Here, the light beam emitted from light source device 10 and transmitted through diffuser plate 12 passes through dichroic mirror 15, is condensed on phosphor layer 21 by condenser lens 14, and excites phosphor layer 21. Diffuser plate 12 diffuses light such that a spot light converged on the phosphor layer has a desired diameter.

Phosphor substrate 20 is configured with phosphor layer 21, aluminum substrate 22, and motor 23. Phosphor layer 21 is formed in an annular shape on a rotationally controllable circular substrate including aluminum substrate 22 and motor 23. Phosphor layer 21 is formed of a Ce-activated YAG-based yellow phosphor that is excited by blue light and emits yellow light containing green and red components. A typical chemical composition of a crystalline matrix of this phosphor is $Y_3Al_5O_{12}$. By rotating phosphor substrate 20, a temperature rise of phosphor layer 21 due to the excitation light is suppressed. As a result, a wavelength conversion efficiency of fluorescence can be stably maintained.

Fluorescent light containing green and red components generated in phosphor layer 21 enters condenser lens 14, and the fluorescent light emitted toward the reflection film side is reflected by the reflection film and then enters condenser lens 14. The generated fluorescent light is converted into substantially parallel light by condenser lens 14, is reflected by dichroic mirror 15, and then converged on rod integrator 6 through rod converging lens 5.

The white light in which the blue light and the yellow light are combined by dichroic mirror 15 enters rod converging lens 5 and converged on rod integrator 6. The light entering rod integrator 6 is emitted after the light intensity distribution is uniformized by being reflected inside rod integrator 6 a plurality of times. The light emitted from rod integrator 6 is converged by relay lens 80, is reflected by reflection mirror 81, passes through field lens 82, and enters total internal reflection prism 83. Total internal reflection prism 83 is configured with two prisms, and thin air layer 90 is formed on adjacent surfaces on which the prisms are adjacent to each other. Air layer 90 totally reflects light entering at angles equal to or larger than a critical angle. The light from field lens 82 is reflected by a total internal reflection surface of total internal reflection prism 83 and enters color prism 84.

Color prism 84 is configured with three prisms, and blue reflecting dichroic mirror 85 and red reflecting dichroic mirror 86 are formed on adjacent surfaces on which the individual prisms are adjacent to each other. The white light having entered color prism 84 is separated into blue light, red light, and green light by blue reflecting dichroic mirror 85 and red reflecting dichroic mirror 86 of color prism 84, and the blue light, red light, and green light enter DMDs 87, 88, 89, respectively. DMDs 87, 88, 89 each deflect micromirrors according to an image signal that is an external signal, so that light is reflected to enter projection lens 75 or to travel to the outside of an effective area of projection lens 75. The light reflected by DMDs 87, 88, 89 passes again through color prism 84. In the course of passing through color prism 84, the separated blue light, red light, and green light are combined and enter total internal reflection prism 83. Since the light having entered total internal reflection prism 83 enters air layer 90 at angles less than or equal to a critical angle, the light passes through total internal reflection prism 83 and enters projection lens 75. In this manner, image light formed by DMDs 87, 88, 89 is enlarged and projected on a screen (not illustrated).

In the above exemplary embodiments, since light source lighting device 100 emits uniform blue light, it is possible to achieve a projection display apparatus that illuminates an area to be illuminated with white light having a good white balance. Further, since DMDs 87, 88, 89 are used as the image forming elements, it is possible to configure a projection display apparatus having higher light resistance and heat resistance than the image forming element using liquid crystal. Further, since three DMDs 87, 88, 89 are used, a bright and high-definition projection image having good color reproduction can be obtained.

As described above, the present exemplary embodiment makes it possible to provide a projection display apparatus using a light source lighting device capable of generating uniform light without extending a length of a rod integrator, thereby contributing to miniaturization of a light source unit.

In the above exemplary embodiments, the blue laser and the phosphor are used as the light source, but red, green, and blue laser light sources may be used to configure the light source lighting device. In this case, also in the light source lighting devices each using the red laser light source or the green laser light source, it is possible to generate uniform red light and green light when the following configuration is used similarly to light source lighting device 100 described in the first exemplary embodiment: aspherical lens 2 as the converging lens and spherical lens 4 as the collimating lens are used; and the aspherical surface coefficient of aspherical lens 2 is set so as to cancel the positive spherical aberration of spherical lens 4. Further, by using red, green, and blue laser light sources, a projection display apparatus having a wider color gamut can be configured.

The present disclosure relates to a projection display apparatus using a laser light source such as a semiconductor laser and a light modulation element such as a liquid crystal panel or a DMD.

What is claimed is:

1. A light source lighting device comprising:
a laser light source unit including
a plurality of semiconductor lasers, and
a first collimating lens that collimates a plurality of light beams emitted from the plurality of semiconductor lasers;
a converging lens that converges a plurality of light beams emitted from the laser light source unit;
at least one diffuser plate that diffuses a plurality of light beams converged by the converging lens; and
a second collimating lens that collimates a light beam diffused by the at least one diffuser plate,
wherein the converging lens has an aspherical surface,
the second collimating lens has a spherical surface,
the aspherical surface of the converging lens has an aspherical surface coefficient that is set to cancel a positive spherical aberration of the second collimating lens, and
a luminous flux density in a proximity of an optical axis is set to be lower than a luminous flux density in a peripheral part away from the optical axis, the optical axis being an axis of a light beam emitted from the second collimating lens.

2. The light source lighting device according to claim 1, wherein
the converging lens has the aspherical surface that serves as an incident surface and a planar surface that serves as an emission surface, and
the second collimating lens has a planar surface that serves as an incident surface and the spherical surface that serves as an emission surface.

3. The light source lighting device according to claim 2, wherein a conical coefficient K of the incident surface of the converging lens satisfies a relationship $-1.3 \leq K \leq -0.5$.

4. A projection display apparatus comprising:
the light source lighting device according to claim 1;
a light guide that guides emission light from the light source lighting device to an area to be illuminated;
a light modulation element that is disposed in the area to be illuminated and modulates the emission light according to an external signal; and
a projection lens that enlarges and projects the emission light modulated by the light modulation element.

* * * * *